E. J. PETERSON.
CORN PLANTER SHOE.
APPLICATION FILED NOV. 24, 1916.
1,219,996.
Patented Mar. 20, 1917.
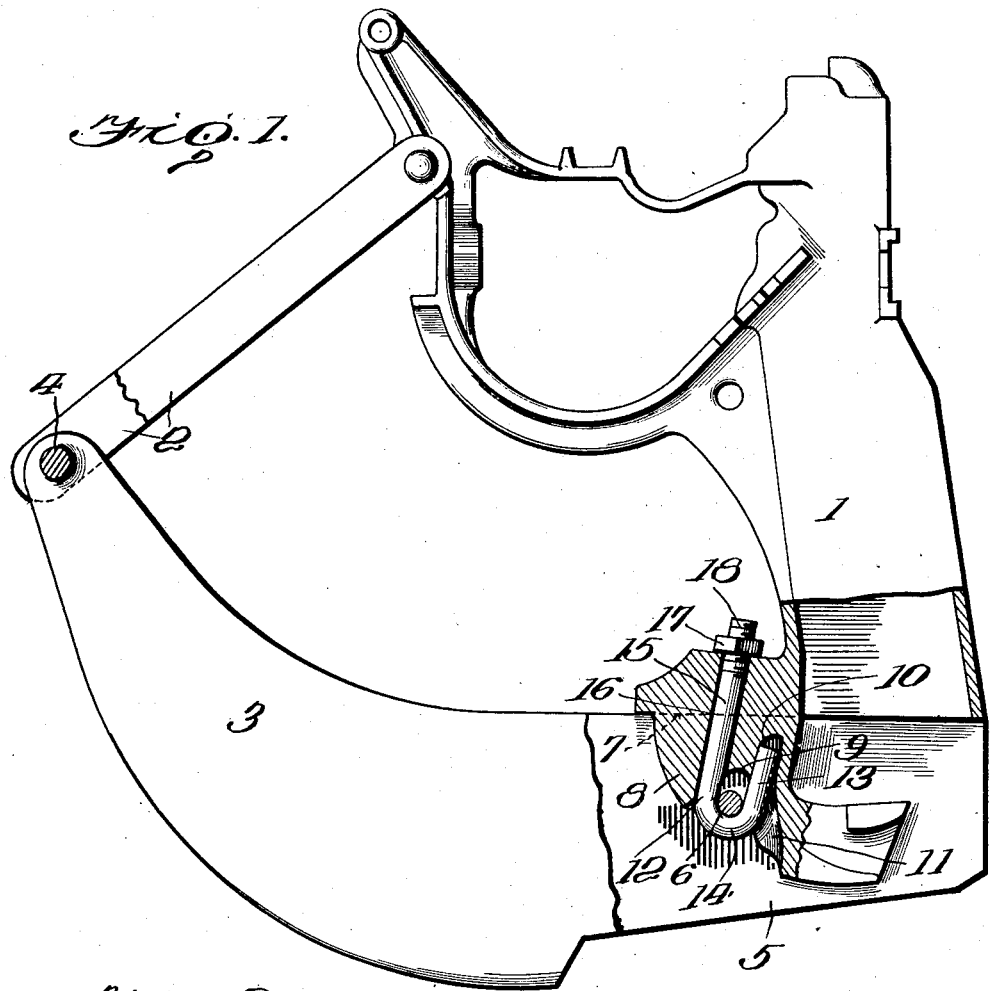
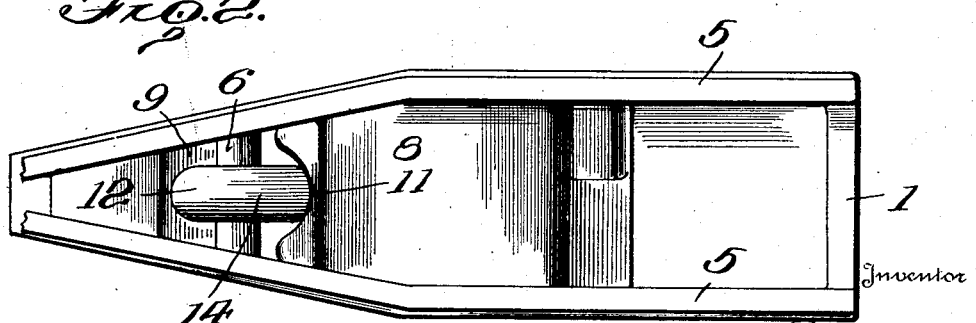

UNITED STATES PATENT OFFICE.

EMIL J. PETERSON, OF ALBION, MICHIGAN, ASSIGNOR TO GALE MANUFACTURING COMPANY, OF ALBION, MICHIGAN.

CORN-PLANTER SHOE.

1,219,996.  Specification of Letters Patent.  Patented Mar. 20, 1917.

Application filed November 24, 1916. Serial No. 133,173.

*To all whom it may concern:*

Be it known that I, EMIL J. PETERSON, citizen of the United States, residing at Albion, in the county of Calhoun and State of Michigan, have invented certain new and useful Improvements in Corn-Planter Shoes; and I do hereby declare the following to be a full, clear, and exact description of the invention, such as will enable others skilled in the art to which it appertains to make and use the same.

My invention relates to improvements in connections for detachably uniting runners or shoes to corn planters.

In the constructions heretofore employed for connecting the runners to the planter, the runner has been fastened to the shank by means of two rivets; one fastening the runner to the braces at the front end of the shank, and the other passing through the runner and shank at the rear or forked end of the runner. This manner of attaching runners caused considerable delay and inconvenience to the user of the planter, as it made it necessary to take the planter to a blacksmith shop, whenever it was desired to renew or repair the runners.

It is the object of my invention to provide mechanism by which the runners may be quickly and easily detached from the planter by the farmer and will obviate the necessity of taking the planter to a machine shop each time it is desired to attach or remove a runner.

With this and other objects in view, my invention consists in the novel features hereinafter described, with reference to the accompanying drawing, and more particularly pointed out in the appended claims.

Referring to the drawings;

Figure 1 is a side view of a planter shank partly in section showing my improved means for attaching a runner thereto.

Fig. 2 is an enlarged bottom plan view of the forked rear end of a runner and my improved means for attaching the same to the planter shank.

In the drawing, 1 is an ordinary planter shank, provided at its front with braces 2, which are connected to the forward end of a planter runner 3, by means of a bolt and nut 4.

The rear end of the runner is forked, to provide two tines 5 and these tines are connected together by means of a rivet 6 which is permanently attached to the runner and extends across the space between the tines. The lower end of the shank 1 is provided on its opposite sides with shoulders 7, only one being shown in Fig. 1, and projecting below these shoulders, is an extension 8, of less thickness than the major portion of the shank. This extension is inserted between the tines of the forked runner until the upper edge of the tines engages the shoulders 7 and its sides are snugly engaged by the inner surfaces of the tines to prevent the runner turning on the shank.

In order to accommodate the rivet 6, the under surface of the extension is recessed at 9, and 10, and the recess 10 opens into a curved guide way 11, for a purpose hereinafter described.

In order to secure the rear end of the runner to the lower end of the shank, I employ a hook bolt 12, having a short shank 13, which is guided into the recess 10 and prevented from moving laterally by means of the curved guide way 11. The hook is inserted from the bottom of the runner and its curved part 14 engages the rivet 6, while its longer shank 15 passes through an opening 16 in the shank, and is secured by means of a nut 17 which engages screw threads 18 on the upper end of the shank 15. With this construction, when it is desired to disconnect the runner, it is only necessary to remove the nuts from the bolts 4 and 12, and the runner will then be free.

It is particularly pointed out that the recess 10 forms a seat wherein the shank extension 13 of the hook bolt will rest, and this construction when the runner is in position, insures great rigidity, and prevents the hook bolt from turning or working loose. The wall of the recess 10 also acts as a lock to prevent the hook bolt 12 from straightening out when the nut 17 is tightened.

From the foregoing, it will be seen that I have provided an improved connection, which in addition to affording great rigidity, is of inexpensive construction, permits the runner to be attached or detached in a short period of time, and with little effort, and makes it unnecessary to take the planter to a shop when a runner is to be removed or replaced.

What I claim and desire to secure by Letters Patent is:—

1. The combination with a planter shank and runner, of a hook bolt secured to said shank and engaging said runner and having its hooked end seated in said shank.

2. In a device of the class described, a shank provided with an aperture and a recess, a runner provided with a rivet, a hook bolt engaging said rivet and resting in said aperture and recess, and means for securing the hook bolt to the shank.

3. In a device of the class described, a shank provided at its lower end with an extension having an aperture extending through the same and a recess in its lower surface, a runner having a forked rear end which engages the sides of said extension, a rivet secured to the forked end of said runner, a hook bolt having a shank extending through said aperture and a hook portion which engages said rivet and rests in said recess, and means for securing the hook bolt to the shank.

In testimony whereof I affix my signature.

EMIL J. PETERSON.

Witness:
G. W. BARTLES.

Copies of this patent may be obtained for five cents each, by addressing the "Commissioner of Patents, Washington, D. C."